(12) United States Patent
Hermann et al.

(10) Patent No.: US 7,522,336 B2
(45) Date of Patent: Apr. 21, 2009

(54) MICROSCOPE TUBE

(75) Inventors: Andreas Hermann, Gleichen (DE); Joerg Sprenger, Gottingen (DE); Hubert Wahl, Stadtroda (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 0 days.

(21) Appl. No.: 11/241,895

(22) Filed: Sep. 30, 2005

(65) Prior Publication Data

US 2006/0077539 A1    Apr. 13, 2006

(30) Foreign Application Priority Data

Sep. 30, 2004    (DE)    ......................... 10 2004 048 101

(51) Int. Cl.
     *G02B 21/22*    (2006.01)
(52) U.S. Cl. ........................................ 359/379; 359/368
(58) Field of Classification Search ................. 359/368, 359/379, 380

See application file for complete search history.

(56) References Cited

U.S. PATENT DOCUMENTS

| | | | | |
|---|---|---|---|---|
| 4,576,450 A | * | 3/1986 | Westphal | ..................... 359/384 |
| 4,691,997 A | | 9/1987 | Muchel | |
| 4,744,642 A | * | 5/1988 | Yoshinaga et al. | .......... 359/379 |
| 5,241,337 A | * | 8/1993 | Betensky et al. | ............ 396/382 |
| 5,657,158 A | | 8/1997 | Baumann et al. | |
| 5,796,487 A | * | 8/1998 | Guerra | ........................ 356/613 |
| 5,914,818 A | | 6/1999 | Tejada et al. | |
| 6,188,515 B1 | | 2/2001 | Nihoshi | |
| 6,193,376 B1 | | 2/2001 | Hayashi et al. | |
| 6,966,658 B2 | | 11/2005 | Fushimi et al. | |
| 2002/0093628 A1 | | 7/2002 | Lewis et al. | |
| 2004/0027630 A1 | * | 2/2004 | Lizotte | ........................ 359/15 |
| 2004/0141231 A1 | | 7/2004 | Hund et al. | |
| 2004/0240048 A1 | | 12/2004 | Dietrich et al. | |

FOREIGN PATENT DOCUMENTS

| | | |
|---|---|---|
| DE | 33 05 650 A1 | 8/1984 |
| DE | 35 08 306 A1 | 9/1986 |
| DE | 195 13 870 A1 | 10/1996 |
| DE | 101 30 621 A1 | 1/2003 |
| DE | 103 00 451 A1 | 7/2004 |
| EP | 1 434 078 A1 | 6/2004 |
| WO | WO 03/032049 A1 | 4/2003 |

* cited by examiner

*Primary Examiner*—Joshua L Pritchett
(74) *Attorney, Agent, or Firm*—Patterson, Thuente, Skaar & Christensen, P.A.

(57) ABSTRACT

An adjustable microscope tube for a microscope includes, in this order, along its beam path coming from an entrance to the microscope tube: an optical system, which images a first intermediate image to infinity; at least one deflecting element, which folds the parallel beam path following the optical system, and collecting optics, arranged following the deflecting element in the beam path, for imaging the first intermediate image, which has been imaged to infinity, onto a second intermediate image, wherein the length of at least one portion of the folded, parallel beam path can be changed by displacement of the deflecting element relative to the optical system.

19 Claims, 6 Drawing Sheets

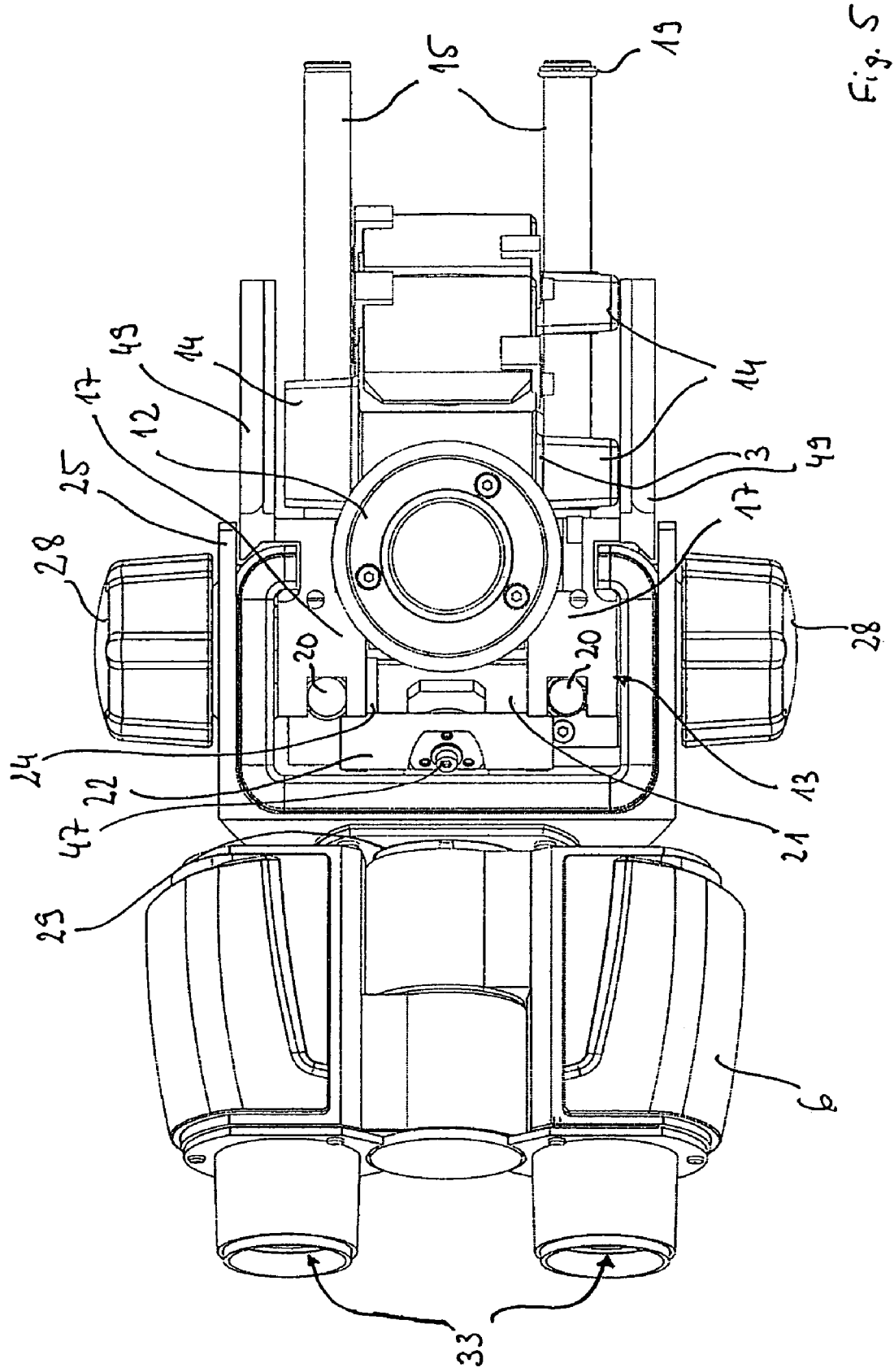

MICROSCOPE TUBE

FIELD OF THE INVENTION

BACKGROUND OF THE INVENTION

The present invention relates to a microscope tube for a microscope.

For microscopic examination of objects, use is often made of microscopes in which an objective forms an image of the object, which can be viewed through an eyepiece, if necessary after further intermediate imaging. The microscope tubes of use may be microscope tubes for only one eyepiece and, in particular, also binocular microscope tubes. In order to make ergonomic working conditions possible at such a microscope for users having different physical heights and different ratios of arm and trunk lengths, it is desirable to enable adjustment of the eyepieces at least in height or vertically, and horizontally or in the viewing direction. Moreover, it may also be advantageous to be able to adjust the viewing angle. However, these latter possibilities of adjustment are not as important as the first two possibilities of adjustment, because the differences between different persons are less significant with regard to the viewing angle.

In order to allow adjustment of the eyepieces, the microscope tube needs to be made suitably adjustable. Such adjustable microscope tubes are basically known already.

Thus, DE 195 13 870 A1 and DE 35 08 306 A1 describe tube systems, wherein the viewing angle is adjustable by the use of a tiltable mirror. However, this solution has the disadvantage that, when changing the viewing angle, a height adjustment is simultaneously effected. Conversely, a height adjustment is not possible without changing the viewing angle. Therefore, such microscope tubes only have a relatively small range of adjustment.

DE 101 30 621 A1 describes a microscope tube which is adjustable in height while the viewing angle remains unchanged. For this purpose, a tube portion, which comprises a tube lens and elements arranged following said tube lens in the beam path, is displaceable relative to afocal entrance optics in a manner allowing the infinite beam path in front of the tube lens to be extended. However, horizontal adjustment or adjustment along the viewing direction is not possible.

U.S. Pat. No. 6,188,515 describes a microscope tube, which comprises afocal optics in the form of a Galilean telescope, which are displaceable relative to an objective of a microscope, for height adjustment, and a tiltable mirror for adjustment of the viewing angle, i.e. of the pivoting direction of the eyepiece. Moreover, the arrangement of the tiltable mirror in the infinite beam path following the afocal optics allows adjustment of the viewing depth, i.e. of the position of the eyepiece in the direction of the optical axis of the eyepiece. However, this solution has the disadvantage that the Galilean telescope, due to the unfavorable position of its exit pupil, only provides a limited possibility of displacement and requires large lens diameters of the subsequently arranged optical elements. Moreover, a camera output is difficult to realize on the microscope tube.

DE 33 05 650 A1 describes a microscope tube, wherein three mirrors arranged in joints respectively deflect the beam path. This solution provides a relatively large adjustment area in different spatial directions. However, the tracking of the mirrors in each joint and the stabilization of the movable parts in the respectively desired position require a complex construction of the microscope tube.

SUMMARY OF THE INVENTION

Therefore, it is an object of the present invention to provide a microscope tube for a microscope, said tube having a simple structure and allowing adjustment over a large adjustment range in at least one direction.

The object is achieved by an adjustable microscope tube for a microscope, said tube sequentially comprising, along its beam path coming from an entrance to the microscope tube: an optical system which images a first intermediate image to infinity; at least one deflecting element, which folds the parallel beam path after the optical system, and collecting optics, arranged following the deflecting element in the beam path, for imaging of the first intermediate image, which has been imaged to infinity, onto a second intermediate image, wherein the length of at least a portion of the folded, parallel beam path can be changed by displacement of the deflecting element relative to the optical system.

Thus, the microscope tube according to the invention initially generates a parallel infinite beam path by means of the optical system, starting from the first intermediate image of the object, which intermediate image may be formed, for example, by a tube lens of the microscope, said infinite beam path then being again focused on an intermediate image plane by means of the collecting optics. For this purpose, the optical system is preferably held in a stationary manner in the microscope tube or is adjustable during installation for a given microscope having a given position of the objective pupil, but is then fixed. The collecting optics image the image of an object, which image has been formed by the optical system, at infinity onto the second intermediate image which may be viewed in magnified form by means of an eyepiece or eyepiece system, e.g. a binocular part. For this purpose, the collecting optics may preferably be connected to a receptacle for the eyepiece or the eyepiece system, said connection being either permanent or releasable, but rigid.

The deflecting element in the infinite beam path, in which further optical elements may be arranged, serves, on the one hand, to fold the beam path once and, thus, to deflect it in a direction which is favorable for the elements of the microscope tube which are subsequently arranged in the beam path and for viewing, respectively. As the deflecting element, a corresponding prism or preferably a mirror may be employed, for example. On the other hand, displacement of the deflecting element allows the length of at least one of the portions of the folded infinite beam path to be changed, so that optical elements of the microscope tube, which are subsequently arranged in the beam path, or the eyepieces, respectively, may be displaced and positionally adjusted in a suitable manner.

Forming an infinite beam path following the optical system allows a large adjustment range, wherein a favorable pupil position may be simultaneously achieved by a corresponding design of the optical system.

Since an adjustment of the microscope tube is effected only in the infinite beam path following the optical system, an adjustment of the microscope tube does not change an achieved positional adjustment of the optical system and of the position of the intermediate image as well as of the objective pupil of the microscope relative to each other. This allows particularly easy mounting of the microscope tube to a microscope. Since only the deflecting element and the collecting optics need to be movable, the effort involved in holding and guiding movable parts is strongly reduced.

The displacement of the deflecting element causes the subsequent part of the beam path of the microscope tube to be displaced as well. Therefore, the collecting optics have to be moved together with the deflecting element, so as to remain in the beam path. A coupling device, which only has to effect coupling of the movements in the displacement direction of the deflecting element on the basis of a movement of the deflecting element or of a support carrying it, preferably serves to move at least the deflecting element and the collecting optics together in the direction in which the deflecting element is displaceable. For this purpose, the coupling device may have any design and, in the simplest case, may be provided, for example, by a common support on which the deflecting element and the coupling optics are held. In addition, an adjustment of the position of the collecting optics relative to the deflecting element may be effected in other directions, independently of the displacement in the displacement direction of the deflecting element. In particular in case the initial focal intercept of the collecting optics is kept short, the collecting optics, when designing the microscope tube of the invention to form a tube for a binocular part, may be combined therewith, thus further reducing the effort involved in holding and guiding movable elements.

The displacement of the deflecting element and the resulting change in the length of the beam path following the optical system may change the position of the pupils in the pupil beam path, which may strongly impair the illumination of the finally viewed image. Therefore, the optical system preferably comprises a field lens. In the context of the invention, the term field lens is also understood to comprise a lens system. The field lens allows the position of the pupils to be favorably changed so that a displacement only causes slight changes in illumination. The image of the objective pupil is preferably located in the infinite beam path following the optical system.

The optical system may additionally comprise further collecting optics for imaging of the first intermediate image, said optics, when using a field lens, preferably being arranged following said field lens in the beam path.

In a very large number of microscopes, the beam path following the just used objective up to the entrance point of the microscope tube extends vertically if the microscope is set up horizontally. In order to enable adjustability of the microscope tube in height or in a vertical direction, the deflecting element is preferably displaceable relative to the optical system in a direction which extends parallel to the direction of the beam path at the entrance to the microscope tube. The already mentioned coupling device then allows at least the collecting optics as well as further optical elements arranged following the deflecting element in the beam path to be moved simultaneously in the same direction.

Further adjustment of the microscope tube is enabled by the coupling optics being displaceable along its optical axis relative to the deflecting element. Thus, in this case, displacement is also effected in the infinite beam path following the optical system. If no further deflecting element is arranged following the collecting optics up to an eyepiece or an eyepiece system, this may allow adjustment of the distance from the microscope in the viewing direction which is then determined by the optical axis of the collecting optics. However, the beam path immediately preceding the collecting optics preferably extends substantially orthogonally to the direction of the beam path at the entrance to the microscope tube, thus allowing the distance to be adjusted in a horizontal direction.

In order to ensure a favorable viewing angle in this case, in particular, an eyepiece-side deflecting element is preferably arranged in the beam path following the collecting optics. Particularly preferably, the eyepiece-side deflecting element is tiltable relative to the optical system. This embodiment enables adjustment of the viewing angle. In this case, it is particularly preferred to provide a linkage, which, when the eyepiece-side deflecting element is being tilted by a tilting angle, also tilts an eyepiece or eyepiece system or a holder carrying said eyepiece or eyepiece system by twice the tilting angle in the same direction.

In order to be able to achieve a low-height construction, the microscope tube preferably comprises first and second deflecting elements, which twice fold the parallel beam path following the optical system, thus forming three portions, with a displacement of at least one of said deflecting elements allowing to change the length of at least one portion of the folded parallel beam path. The deflecting element provided in addition to the already mentioned deflecting element can be arranged preceding it or following it in the beam path.

According to this embodiment, too, the microscope tube preferably comprises a coupling device which, when the movable deflecting element is being displaced, also moves at least the collecting optics in the same direction. If the movable deflecting element in the infinite beam path is arranged following the optical system and preceding the other deflecting element, the coupling device preferably moves the other deflecting element along when displacing the movable deflecting element.

A particularly low constructional height may be achieved by a second portion of the folded parallel beam path extending between the first and second deflecting elements, parallel to the direction of the beam path at the entrance to the microscope tube and, in particular, in the opposite direction.

For adjustment, in particular, of the height of an eyepiece or eyepiece system held on the microscope tube, it is then preferred for the second deflecting element to be movable together with the collecting optics, along the second portion of the folded beam path, relative to the optical system.

A further possibility of adjustment is provided by a microscope tube according to the invention, wherein the first deflecting element is movable together with the second deflecting element and the collecting optics, along the first portion of the folded beam path, relative to the optical system. Preferably, the corresponding portion of the folded parallel beam path extends transverse to the direction of the beam path at the entrance to the microscope tube. For this purpose, the optical system may not only image the first intermediate image to infinity, but may also deflect the beam path in the corresponding direction. Such a microscope tube allows not only to adjust the height according to the length of a person's trunk, but also to achieve a working position which is favorable for the length of the arms of a person by adjustment of the distance. In doing so, a further coupling device can preferably move the second deflecting element and the collecting optics together in the same direction, when the first deflecting element is being displaced. Similar to the first-mentioned coupling device, the further coupling device only needs to transmit a movement of the first deflecting element, relative to the optical system, to the subsequently arranged optical elements in the beam path, which is not necessarily required in the opposite case.

A further reduction in constructional height can preferably be achieved by the optical system comprising further collecting optics in a portion of the beam path which extends parallel to the beam path preceding the first deflecting element. At least part of the beam path in the optical system can then extend transversely to the beam path at the entrance to the microscope tube.

In principle, the microscope tube according to the invention may be used for any desired microscopes. In order to be able to ensure that the first intermediate image is, in fact, formed in the provided intermediate image plane in the microscope tube, a tube lens or tube lens system for forming a first intermediate image is preferably arranged in the entrance beam path of the microscope tube according to the invention. Said tube lens or tube lens system is preferably provided for use with a microscope comprising an infinite beam path with respect to the imaging of the object.

In many cases, it is desired to enable also the capturing of images in addition to viewing an object with a microscope. Therefore, a beam splitter is preferably arranged in the beam path preceding the optical system, said beam splitter splitting the beam path into a beam path for the first intermediate image and a beam path for a third intermediate image. Said third intermediate image may then be captured or further imaged by corresponding additional equipment. The beam splitter is preferably fixed relative to the optical system or the microscope tube. Therefore, suitable additional equipment may be permanently installed and may remain unaffected by the adjustment of the microscope tube. For this purpose, the microscope tube may comprise a suitable connection for additional equipment.

In particular, the microscope tube preferably comprises a connection for a camera which is designed such that the third intermediate image can be captured by the camera connected to said connection. Such a microscope tube allows visual inspection simultaneously with the capturing of images by a camera.

The beam splitter may, in principle, deflect the beam path for forming the third intermediate image. However, in order to achieve a compact construction of the microscope tube, in particular in the case of a tube lens having a large focal intercept, the beam splitter preferably deflects the beam path leading to the optical system. The beam path for the third intermediate image is then preferably rectilinear.

In order to also allow modification of the viewing angle, i.e. the angle between the optical axis of the collecting optics and, according to the respective definition, a horizontal or vertical direction, in the microscope tube according to the invention the deflecting element immediately preceding the collecting optics in the beam path is preferably rotatable or pivotable together with the collecting optics, with a transmission being provided which, when pivoting the collecting optics by a given pivoting angle, tilts the second deflecting element by an angle half the amount of the pivoting angle.

In certain fields of application, such as material research, for example, an image of an object is typically expected to be upright and the right way around. In a further embodiment of the microscope tube according to the invention, the number of reflecting surfaces in the beam path of the microscope tube according to the invention and the number, type and arrangement of the lenses are selected such that a second upright intermediate image, which is the right way around, is formed in the second intermediate image plane.

In other fields of application, users are used to inverted images. For this purpose, in the microscope tube according to the invention, there is preferably provided, in the beam path a roof prism which effects inversion of the image.

In order to improve the imaging quality of the optical system, the latter preferably comprises at least one further lens for correction of distortions. Said further lens preferably serves the purpose of field flattening. In particular, said lens may be arranged between the field lens and the further collecting optics.

BRIEF DESCRIPTION OF THE DRAWINGS

The invention will be explained in more detail below, by way of example and with reference to the drawings, wherein:

FIG. 5 shows a top view of the partially opened microscope tube of FIG. 3;

DETAILED DESCRIPTION OF THE INVENTION

Figure 1:
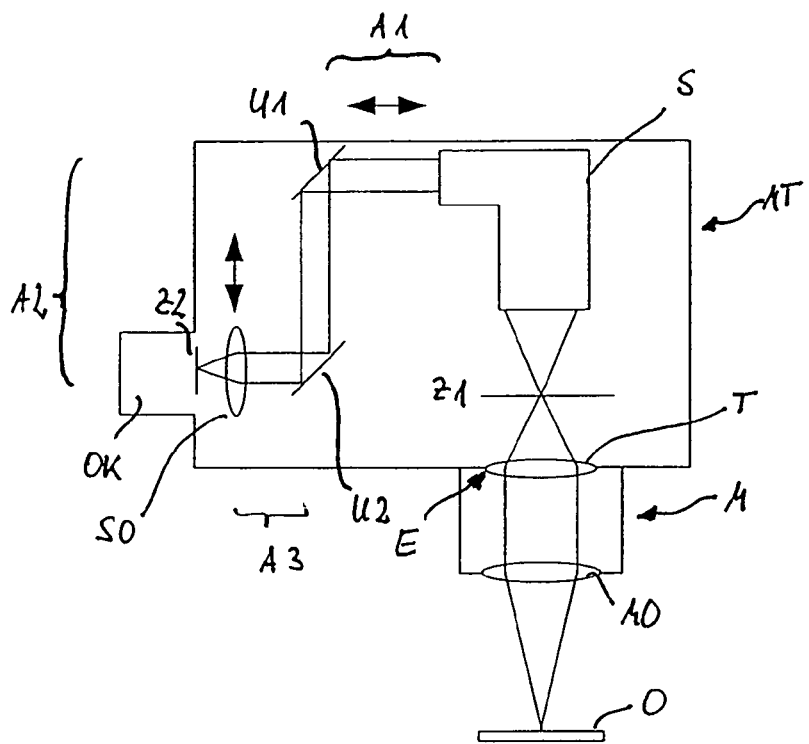
FIG. 1 shows a schematic representation explaining basic characteristics of a beam path of a microscope tube according to first and second preferred embodiments of the invention.

FIG. 1 shows common basic features of beam paths in microscope tubes according to first and second preferred embodiments of the invention.

An object O is imaged to infinity by an objective MO of a microscope M. The microscope tube MT is arranged in the parallel beam path following the objective MO. A tube lens T focuses the parallel beam path, which enters through the entrance E of the microscope tube MT, onto a first intermediate image plane Z1, wherein a first real intermediate image of the object O is formed. The first intermediate image is imaged to infinity by an optical system S of the microscope tube MT with a 90° deflection. The resulting beam path is parallel and is folded twice by first and second deflecting elements U1 and/or U2, thus forming portions A1, A2 and A3. Collecting optics SO are arranged in the beam path following the second deflecting element U2, said collecting optics SO focusing the beam path onto a second intermediate image plane Z2. A second intermediate image of the object O formed therein can be viewed through the eyepieces OK. By displacing the deflecting elements U1 and U2 in directions parallel to the portions A1 and A2, respectively, of the parallel beam path, the corresponding portions can be changed in length. By means of suitable coupling devices, the elements respectively following in the beam path are moved simultaneously in the same manner, i.e. the second deflecting element U2, the collecting optics SO and the eyepieces OK are simultaneously displaced in the direction of A1 when displacing U1, and the collecting optics SO as well as the eyepieces OK are simultaneously displaced in the direction of A2 when displacing U2. This allows adjustment in two directions, i.e. an adjustment in height and an adjustment of the distance from the microscope M.

Figure 2:
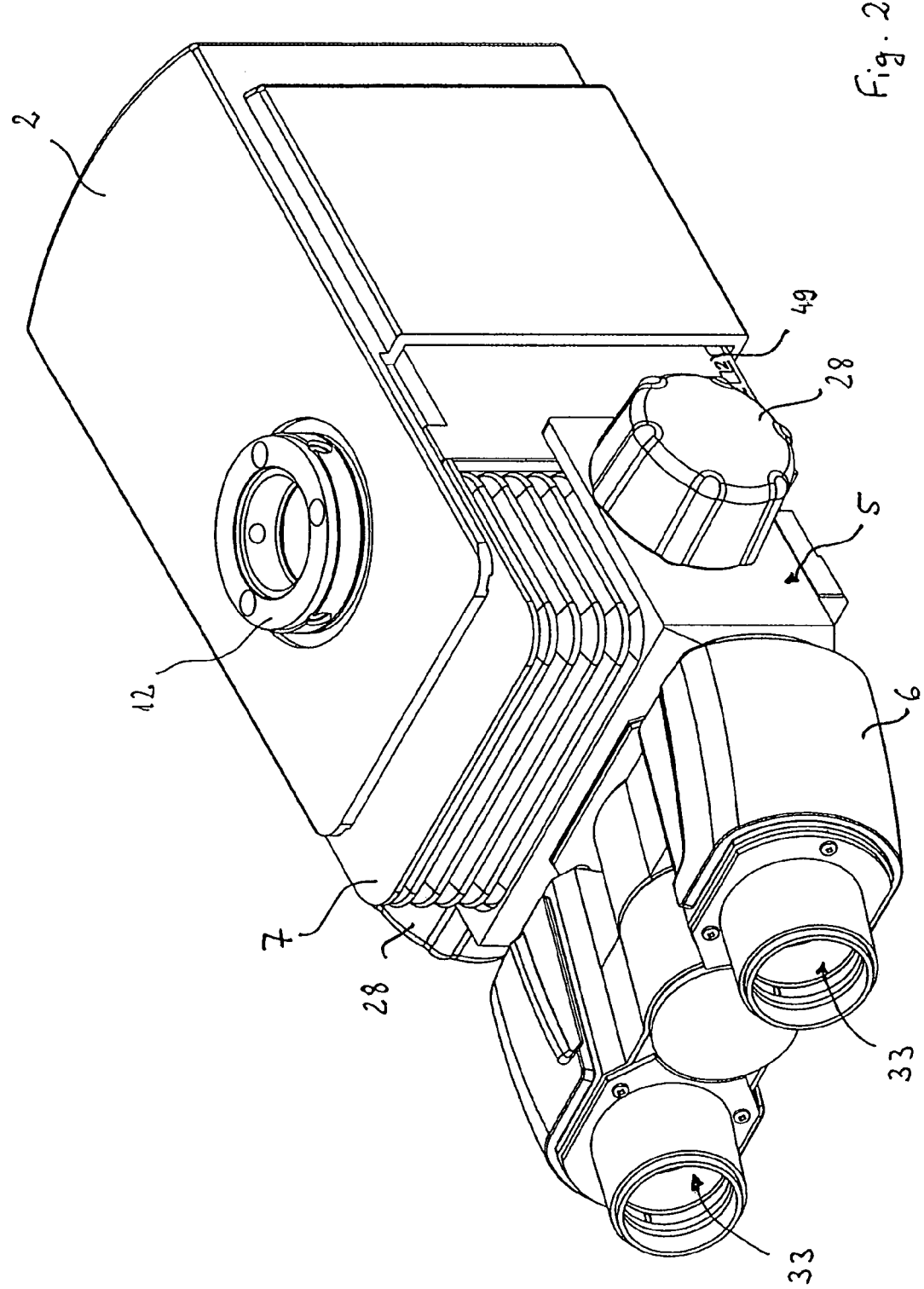
FIG. 2 shows a perspective front and top view of a microscope tube according to a first preferred embodiment of the invention.
Figure 3:
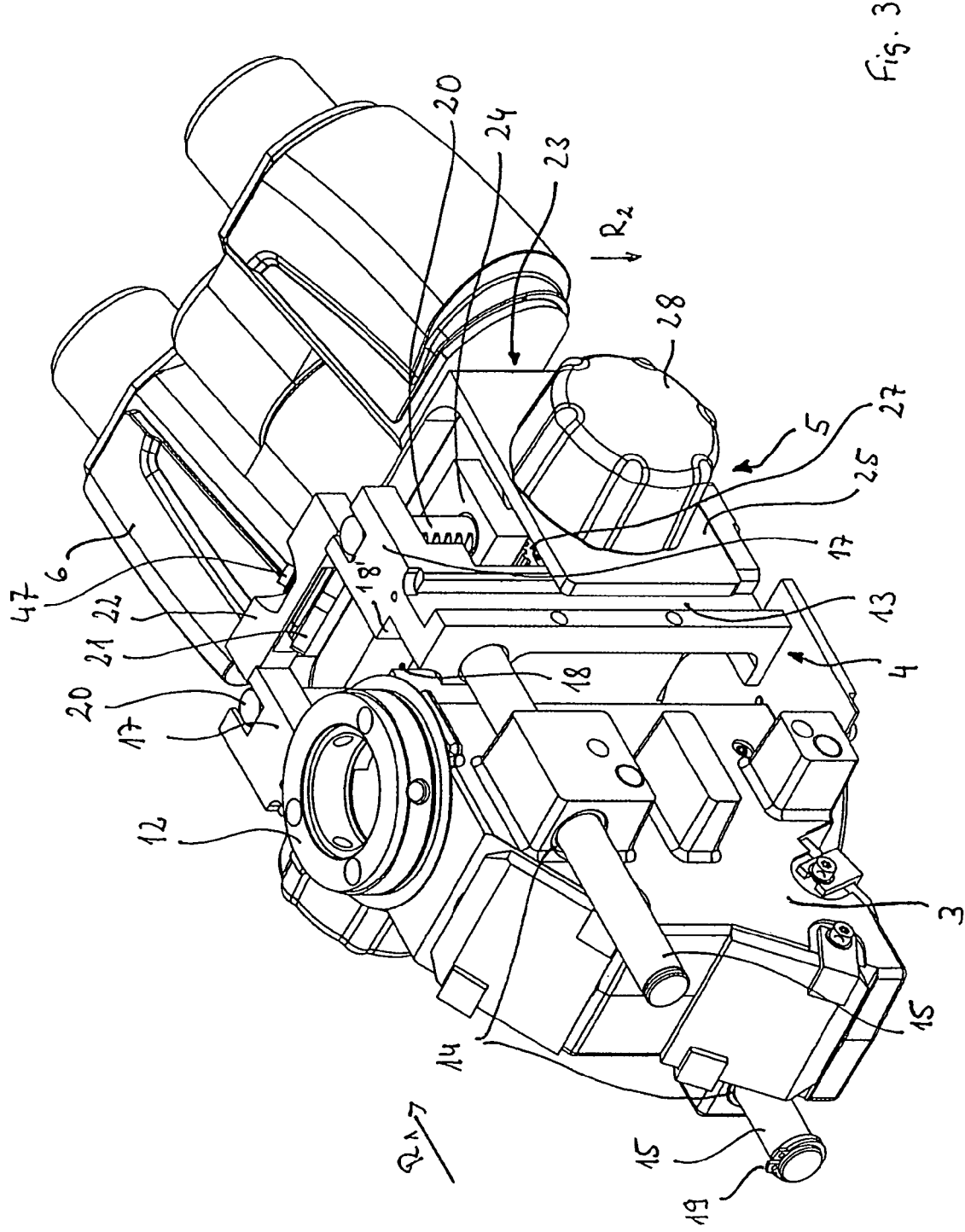
FIG. 3 shows a perspective rear and top view of the microscope tube of FIG. 2 with the housing removed.
Figure 4:
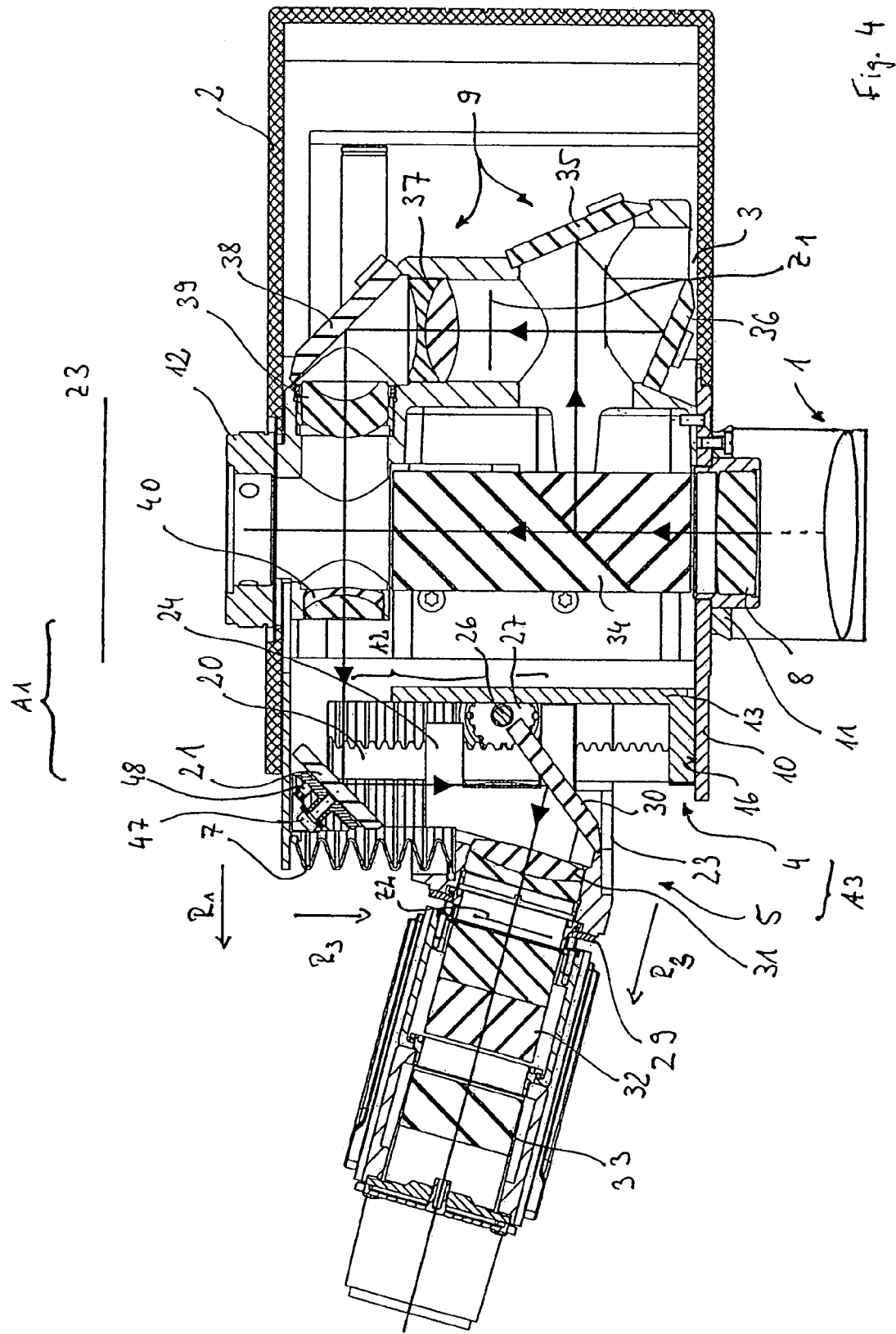
FIG. 4 shows a sectional view of the microscope tube of FIG. 2.

FIGS. 2 to 6 more specifically show an adjustable microscope tube according to a first preferred embodiment of the invention for a microscope 1, which is shown only very schematically in FIG. 4, having an infinite beam path. The microscope tube has an upper housing part 2, a base body 3, which partially forms a lower housing part, a first assembly 4, which is displaceable relative to the base body in a first direction, a second assembly 5, which is held on the first assembly 4 so as to be displaceable in a second direction, and an eyepiece system in the form of a binocular part 6, which is securely held on the second assembly 5. A bellows 7 closes an opening between the first assembly 4 and the second assembly 5. Side plates 49 close an opening between the upper housing part 2 and the first assembly 4.

The base body 3 comprising the first and second assemblies 4 and 5 held thereon and the binocular part 6 is shown in more detail in FIGS. 2 to 4.

The base body 3 serves to receive part of the optics (described in more detail below) of the microscope tube, namely a tube lens 8 and an optical system 9 (conf. FIG. 4).

A mounting flange 11, which is held in the bottom 10 of the base body 3 and by means of which the microscope tube is mountable or mounted to the microscope 1, serves as a receptacle for the tube lens 8 and as an entrance or entrance opening for the beam path of the microscope. The mounting flange 11 is aligned such that the optical axis of the tube lens 8 is aligned to the infinite beam path of the microscope 1, and, thus, it also serves as a centering element.

A camera connection 12 on the upper surface of the base body 3 is located opposite the mounting flange 11 in the rectilinear extension of the infinite beam path of the microscope 1 and serves to connect a camera, which is not shown in the Figures.

The base body 3 is open toward the front, i.e. in a first direction R1 which corresponds to the direction of the exit beam path of the optical system 9 and is orthogonal to the optical axis of the tube lens 8.

The first assembly 4 comprises a first carrier 13, which is held on the base body 3 by guiding rods 15 guided in guiding sleeves 14, which are mounted in the side walls of the base body 3, and by which said carrier 13 is guided so as to be displaceable in the first direction. One of said guiding rods is guided in two guiding sleeves, while the other guiding rod runs in only one guiding sleeve and thus prevents the assembly 4 from tilting transversely to the direction of the guiding rods.

The side plates 49 are mounted to the first carrier 13 and are thus displaceable together with it.

The carrier 13 is U-shaped in a plane orthogonal to the direction of the infinite beam path of the microscope 1, said beam path being identical with the direction of the beam path at the entrance to the microscope tube, or parallel to the bottom 10, so that, during displacement in the first direction, the camera connection 12 and the optical system 9 can come between the arms 17 of the U, thus enlarging the range of displacement. Stops 18 and 18' on the base body 3 or on the first carrier 13 prevent excessive displacement of the first carrier 13 toward the base body 3. A retainer ring 19 at the end of the guiding rod 15 that is guided in two guiding sleeves 14 prevents the first assembly from being pulled off the base body 3.

Two toothed racks 20 are held bilaterally between the arms 17 of the carrier 13 in a second direction R2, which is orthogonal to the first direction R1 and parallel to the optical axis of the tube lens 8.

A first deflecting element 21 in the form of a mirror is held between the arms 17 by a holder 22. The first deflecting element 21 can be respectively staggered or tilted by means of a screw 47 and three threaded pins 48, in order to adjust the parallel beam path of the optical system 9 to the subsequent optical elements in the beam path.

The second assembly 5 comprises a U-shaped second carrier 23, on which guiding blocks 24 are held through which the toothed racks 20 pass. The second assembly 5 is, therefore, held on the first assembly 4 so as to be displaceable in the second direction R2, guided by the guiding blocks 24 and the toothed racks 20.

A shaft 26 comprising pinions 27 which engage the toothed racks 20 is supported in lateral arms 25 of the second carrier 23. On the one hand, the shaft 26 with the pinions 27 engaging the toothed racks 20 is rotatable by means of rotary knobs 28 mounted to opposite ends of the shaft 26, so that the second carrier 23 and, together with it, the second assembly 5 are displaceable in the second direction R2 relative to the first assembly 4 and the optical system 9.

On the other hand, pulling or pushing the rotary knobs 28 in the first direction R1 allows the first assembly 4 to be displaced together with the second assembly 5 in the first direction R1 relative to the base body 3 and, thus, to the optical system 9.

Therefore, a coupling device for coupling the movement of the first and second assemblies 4 and 5, respectively, in the first direction R1 is provided by the guide formed by the toothed racks 20 and the guiding blocks 24 which guides the second assembly 5 along the first assembly 4.

In the lower part, as seen in the Figures, of the front face of the second carrier 23, a binocular receptacle 29 is arranged by means of which the binocular part 6 can be mounted to the second assembly 5 in a predetermined, fixed position.

In this area of the second carrier 23, a mirror is arranged as the second deflecting element 30. The binocular receptacle 29 further serves as a mount for collecting optics 31.

In addition to a binocular beam splitter 32, the binocular part 5 has arranged in its beam path eyepieces 33 such that they allow viewing of intermediate images formed by the collecting optics 31.

Therefore, the second carrier 23 functions as a a coupling device which, when moving the second deflecting element 30 in the second direction R2, simultaneously moves the collecting optics 31 in the same direction.

The optics of the microscope tube are structured as follows (cf. FIG. 4): A beam splitter 34 is arranged in the beam path of the tube lens 8 arranged in the beam path of the microscope, which beam splitter 34 allows part of the beam coming from the tube lens 8 to pass in the direction of the camera connection 12 and deflects the other part in a direction orthogonal to the optical axis of the tube lens 8 and, thus, to the direction of the beam path at the entrance to the microscope tube, and into the optical system 9, which is mounted in the base body 3. The elements of the optical system 9 which follow in the deflected beam path are third and fourth deflecting elements in the form of mirrors 35 and 36 inclined relative to each other by an angle of 45°, said mirrors deflecting said beam path in a direction parallel to the optical axis of the tube lens 8. In the subsequent beam path, there are arranged, as further elements of the optical system 9, a field lens 37, provided by two combined lenses in the example, and a fifth deflecting element 38 in the form of a mirror for deflecting the beam path in the first direction, a lens 39 for correction of distortions, i.e. for field flattening in the example, and further collecting optics 40.

Following in the beam path of the optical system 9 or of the further collecting optics 40, respectively, are the first and second deflecting elements 21 and 30, which fold the parallel infinite beam path twice between the optical system 9 and the collecting optics 31, thus forming three portions A1, A2 and A3. The first deflecting element 21 deflects the beam path of the first portion A1 from the first direction R1 to the second direction R2, which is opposed to the direction of the light entering the tube lens 8, thus forming the second portion A2.

The second deflecting element 30 then deflects the beam path from the second portion A2 to the third portion A3, i.e. in the third direction R3, which forms an angle of about 75° with the second direction R2, and into the collecting optics 31.

Then, the binocular beam splitter 32 splits the beam path into two partial beam paths, in which the eyepieces 33 of the binocular part 6 are located.

The tube lens 8 images the object image, which was formed at infinity by an objective of the microscope 1, into a first intermediate image plane Z1 as a first intermediate image, which image plane is laterally offset relative to the infinite beam path of the microscope due to the multiple deflection by the beam splitter 34 and the third and fourth deflecting elements 35 and 36. The field lens 37 serves to image the objective pupil to a favorable location of the beam path. In the example, the objective pupil is imaged into the portion of the beam path between the first and second deflecting elements 21 and 30, i.e. the second portion of the folded infinite beam path, such that, even upon maximum displacement of the first and second assemblies 4 and 5, respectively, the pupil remains between said deflecting elements. The further collecting optics 40 image the intermediate image of the object in the intermediate image plane Z1 to infinity, so that the next beam path is parallel. After deflection by the first and second deflecting elements 21 and 30, the parallel beam path is focused, by the collecting optics 31, onto a second intermediate image plane Z2, such that an upright second intermediate image of the object is formed there, which image is the right way around and can be viewed through the eyepieces 33.

A third intermediate image of the object is formed in a third intermediate image plane Z3 in the undeflected beam path following the beam splitter 34, which image can be captured by means of a camera connected to the camera connection 12.

Since the tube lens 8 and the optical system 9 are securely mounted in the base body 2, the position of the third intermediate image is not changed by an adjustment of the microscope tube by displacement of one of the assemblies 4 or 5. Further, the position of the first intermediate image remains unchanged.

In the exemplary embodiment, the lenses are specifically designed and arranged as follows: The field lens 37 is formed by two lenses arranged next to each other. The first lens in the beam path, a lens having a thickness of 9 mm, is bi-convex and is curved with an entrance-side radius of 29.427 mm and an exit-side radius of 24.760 mm. The lens material has a refractive index of 1.79007 and an Abbe dispersion number of 43.80. The second lens with a thickness of 2 mm is bi-concave, having an entrance-side surface with a radius of 24.760 mm and an exit-side surface with a radius of 35.996 mm. The material of this lens has a refractive index of 1.75453 and an Abbe dispersion number of 35.10.

At a distance of 38 mm along the light path follows the 9.89 mm thick, concave-convex lens 39 serving the purpose of field flattening, which lens is limited by an entrance-side concave surface having a radius of curvature of 10.746 mm and by an exit-side convex surface having a radius of curvature of 15.963 mm. The material of the lens has a refractive index of 1.70824 and an Abbe dispersion number of 39.12. At a distance of 40 mm follow the further collecting optics 40, which consist of two joined up lenses. The first lens, which is 2 mm thick, is convex-concave, having a radius of 36.781 mm of the entrance-side convex surface and a radius of 15.849 mm of the concave exit-side surface. The refractive index of the lens material used is 1.58569, its Abbe dispersion number being 46.35. The convex-concave second lens, which is 6 mm thick, is limited on the entrance side by a surface having a radius of 15.849 mm and on the exit side by a surface having a radius of 104.41 mm. The material of the lens has a refractive index of 1.53019 and an Abbe dispersion number of 76.58.

The collecting optics 31, which are made up of two joined up lenses, follow at a distance of from 62.0 mm to 152.0 mm along the beam path, said distance being variable by displacement of the first and/or second deflecting elements. The first, bi-convex lens, which is 6.8 mm thick, comprises an entrance-side surface having a curvature of 84.140 mm and an exit-side surface having a curvature of 53.088 mm. The material of said lens has a refractive index of 1.65391 and an Abbe dispersion number of 55.63. The second concave-convex lens, which is 3.6 mm thick, is limited by an entrance-side surface having a radius of 53.088 mm and by an exit-side surface having a radius of 294.27 mm.

The second intermediate image is formed at a distance of 154.34 mm from the collecting optics 31.

When the first assembly 4 is displaced relative to the base body 3 and, thus, to the optical system 9, the second assembly 5 is simultaneously displaced in the same direction. The arrangement of the first deflecting element 21 in the parallel infinite beam path of the optical system 9 or of the further collecting optics 40, respectively, enables a wide displacement range in the first direction R1, which direction extends horizontally when the infinite beam path of the microscope is vertically oriented. Thus, the microscope tube allows the distance of the eyepieces 33 from the microscope 1 to be largely adjusted in a horizontal direction.

Figure 6:
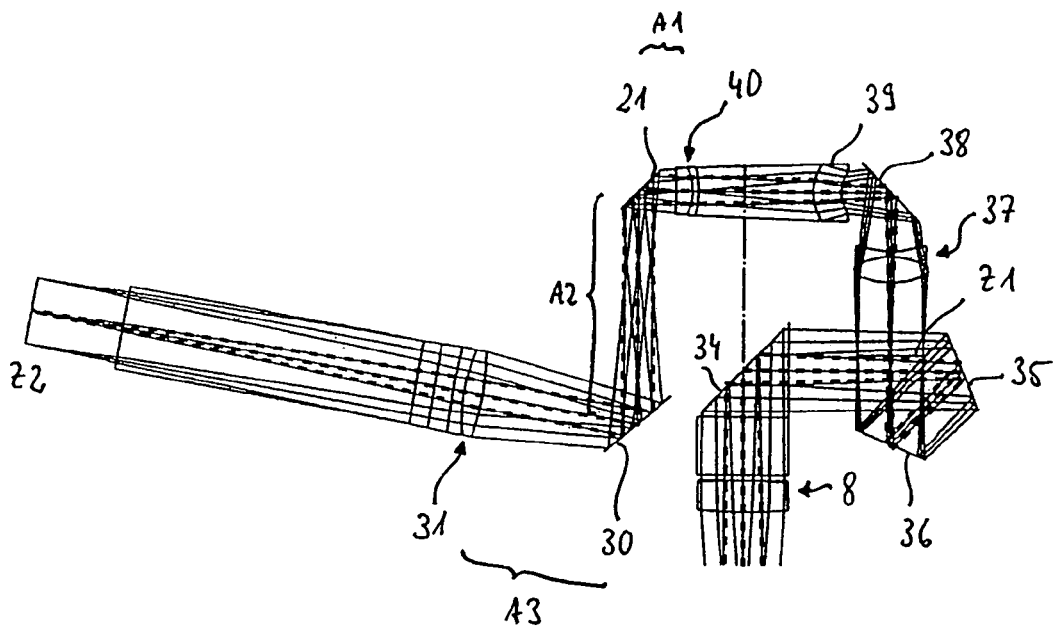
FIG. 6 shows a representation of the field and pupil beam path in the microscope tube of FIG. 2.

FIG. 6 shows the resulting field beam path in broken lines and the pupil beam path in solid lines.

The displacement of the second assembly 5 in the second direction R2, which is vertical for the aforementioned orientation of the infinite beam path of the microscope, may be effected independently of the displacement in the first direction R1, thus allowing a simple and very flexible adaptation of the viewing position to the stature of an operator without causing excessive disadvantages for the intensity distribution in the third intermediate image. In this case, too, the arrangement of the second deflecting element 30 in the infinite beam path of the optical system 3 deflected by the first deflecting element 21 allows a large adjustment range in the second direction R2.

Figure 7:
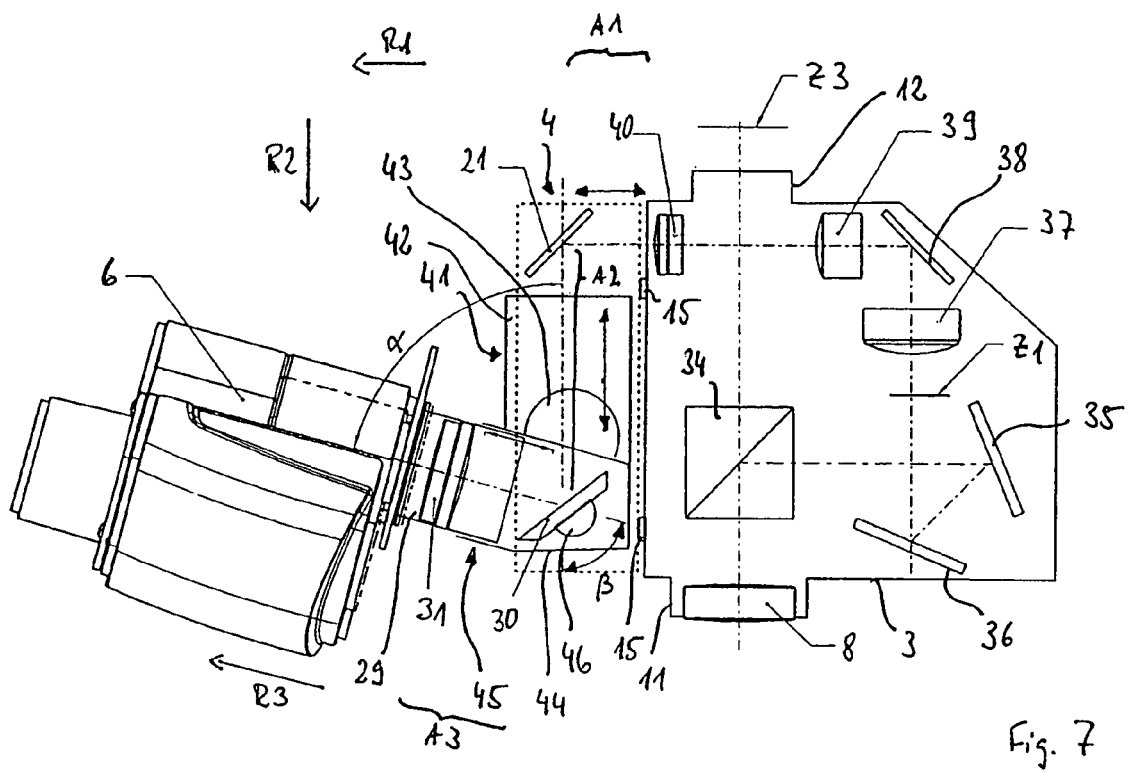
FIG. 7 shows a schematic sectional view of a microscope tube according to a second preferred embodiment of the invention.

An adjustable microscope tube for a microscope having an infinite beam path according to a second preferred embodiment of the invention, which is schematically shown in FIG. 7, differs from the microscope tube of the first exemplary embodiment in that two further possibilities of adjustment are provided, for which purpose the second assembly 5 is replaced with a modified second assembly 41. The other components of the microscope tube remain unchanged so that the same reference numerals as in the first exemplary embodiment are used for them and the explanations apply accordingly.

The second assembly 41 differs from the second assembly 5 only in the adjustability of the second deflecting unit 30 and the collecting optics 31, so that unchanged components of this assembly, too, are also referred to by the same reference numerals as in the first exemplary embodiment and the same explanations apply here as well.

On a second carrier 42, which is otherwise identical with the second carrier 13, a third carrier 44 is now pivotably held via a joint 43, said third carrier 44 having the collecting optics 31 and the binocular receptacle 29 mounted thereto, guided by a guide 45 so as to be displaceable in a third direction R3 parallel to the optical axis of the collecting optics 31. To this end, the binocular receptacle 29 may be guided in a linearly displaceable manner, in the example, in a tube forming an arm of the joint 43.

The second deflecting element 30, which is otherwise unchanged as compared to the first exemplary embodiment, is now rotatably supported on the second carrier 42. A gear reducer 46 couples a pivoting movement of the third carrier 44 and thus of the collecting optics 31 and the binocular receptacle 29 with a rotary movement of the second deflecting element 30. When the third carrier 44 is being pivoted by a predetermined angle $\alpha$, the second deflecting element 30 is tilted by half the angle $\beta=\alpha/2$ in the same direction, so that the beam path following the first deflecting element 21 is still deflected from the second deflecting element 30 to the collecting optics 31 and the binocular receptacle 29 each time the third carrier is pivoted.

In addition to the possibilities of adjustment in the first and second directions, it is now also possible, independently of these possibilities of adjustment, to adjust the viewing angle, given by the angle between a horizontal line and the optical axis of the collecting optics 31 or the eyepieces 33, respectively, and/or to independently adjust the distance in the viewing direction or in the third direction R3, respectively, or the optical axis of the collecting optics 31.

A microscope tube according to a third preferred embodiment of the invention differs from the microscope tube of the second exemplary embodiment in that a roof prism is employed instead of the third and fourth deflecting elements 35 and 36, whereby the first intermediate image is inverted relative to the first intermediate image of the second exemplary embodiment. Thus, also the second intermediate image, but not the third intermediate image, is inverted.

Figure 8:
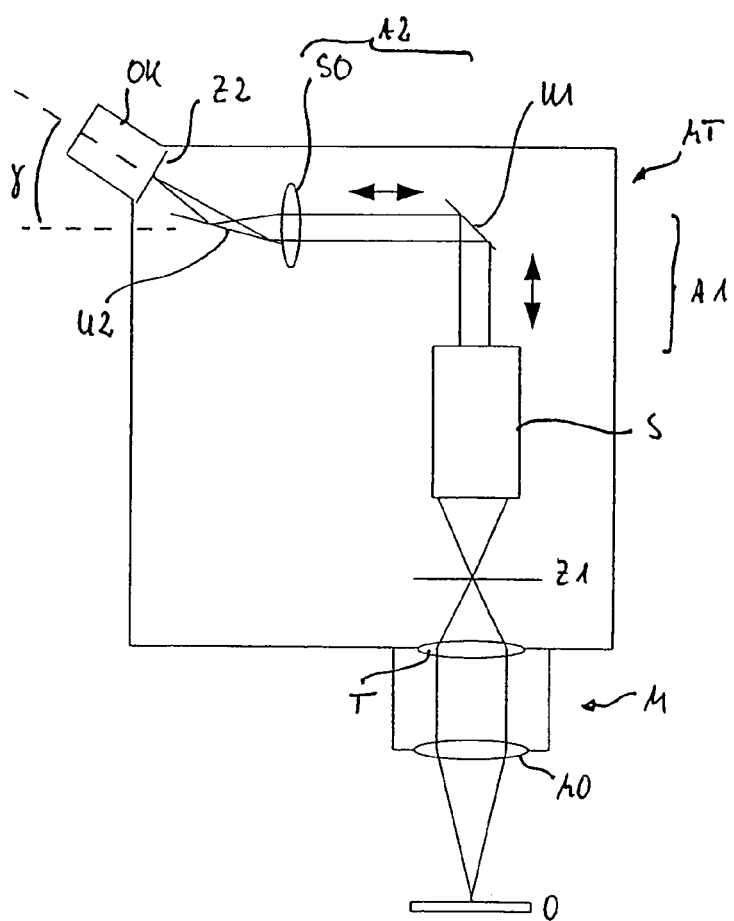
FIG. 8 shows a schematic representation of a microscope tube according to a fourth preferred embodiment of the invention.

FIG. 8 very schematically shows a microscope tube according to a third preferred embodiment of the invention.

Similar to FIG. 1, an object O is imaged to infinity by an objective MO of a microscope M. In the parallel beam path following the objective MO, the microscope tube MT according to a fourth preferred embodiment of the invention is arranged. A tube lens T focuses the parallel beam path, which enters through the entrance of the microscope tube MT, onto a first intermediate image plane Z1, wherein a first real intermediate image of the object O is formed. Said first intermediate image is imaged to infinity by an optical system S of the microscope tube. The resulting beam path is parallel and is folded once by a first deflecting element U1, thus forming portions A1 and A2. Collecting optics SO are arranged in the beam path following the first deflecting element U1, said collecting optics SO focusing the beam path onto a second intermediate image plane Z2. Preceding said intermediate image plane, there is also a second eyepiece-side deflecting element U2. A second intermediate image of the object O, which is formed in the second intermediate image plane Z2, can be viewed through the eyepieces OK.

The deflecting element U1 is displaceable, by means of a coupling device, together with the coupling optics SO, the second deflecting element U2 and the eyepieces OK in the direction of portion A1 and, thus, in height, and the collecting optics SO are displaceable, by means of a further coupling device, together with the second deflecting element U2 and the eyepieces OK in the direction of portion A2. The second deflecting element U2 is tiltable, with a transmission not shown in FIG. 8 also pivoting the collecting optics SO and the eyepieces OK by twice the angle, when tilting the deflecting element U2.

By displacing the deflecting element U1 and the collecting optics SO relative to the optical system S in directions parallel to the portions A1 and A2 of the parallel beam path, the lengths of the corresponding portions can be changed. Since the elements respectively following in the beam path are moved simultaneously in the same manner, it is possible to effect adjustment in two directions, i.e. an adjustment in height and an adjustment of the distance from the microscope M.

The viewing angle $\gamma$ can be adjusted by tilting the second deflecting element U.

The invention claimed is:

1. An adjustable microscope tube for a microscope, said microscope tube comprising, in order, along its beam path starting from an entrance to the microscope tube:
   an optical system positioned to receive light from a microscope objective, which images a first intermediate image to infinity, wherein the first intermediate image is a real image;
   at least one deflecting element, following the optical system, which folds the parallel beam path; and
   collecting optics, arranged following the deflecting element in the beam path, imaging the first intermediate image imaged to infinity onto a second intermediate image,
   wherein the length of at least one portion of the folded, parallel beam path can be changed by displacement of the deflecting element relative to the optical system.

2. The microscope tube as claimed in claim 1, wherein the optical system comprises a field lens.

3. The microscope tube as claimed in claim 1, wherein the deflecting element is displaceable relative to the optical system in a direction parallel to the direction of the beam path at the entrance to the microscope tube.

4. The microscope tube as claimed in claim 1, wherein the collecting optics are displaceable along their optical axis relative to the deflecting element.

5. The microscope tube as claimed in claim 1, further comprising an eyepiece-side deflecting element arranged in the beam path following the collecting optics.

6. The microscope tube as claimed in claim 5, wherein the eyepiece-side deflecting element is tiltable relative to the optical system.

7. The microscope tube as claimed in claim 1, comprising a first deflecting element and a second deflecting element, the first and second deflecting elements together twice folding the parallel beam path following the optical system, thus forming three portions of the parallel beam path, including a first portion, a second portion and a third portion, with a displacement of at least one of the deflecting elements allowing the length of at least one portion of the folded parallel beam path to be changed.

8. The microscope tube as claimed in claim 7, further comprising a coupling device which, during displacement of the movable deflecting element, simultaneously moves at least the collecting optics in the same direction.

9. The microscope tube as claimed in claim 8, wherein the optical system comprises at least one further lens for correction of distortion.

10. The microscope tube as claimed in claim 7, wherein the second portion of the folded parallel beam path between the first and second deflecting elements extends substantially parallel to the direction of the beam path at the entrance to the microscope tube.

11. The microscope tube as claimed in claim 7, wherein the second deflecting element is displaceable, together with the collecting optics, along the second portion of the folded beam path relative to the optical system.

12. The microscope tube as claimed in claim 7, wherein the first deflecting element is movable, together with the second deflecting element and the collecting optics, along the first portion of the folded beam path relative to the optical system.

13. The microscope tube as claimed in claim 7, wherein the optical system comprises second collecting optics in a portion of the beam path, which extends substantially parallel to the beam path preceding the first deflecting element.

14. The microscope tube as claimed in claim 7, wherein the collecting optics are displaceable relative to the second deflecting element, said microscope tube comprising a guide guiding the collecting optics along a third direction which is substantially parallel to an optical axis of the collecting optics.

15. The microscope tube as claimed in claim 1, further comprising a tube lens or a tube lens system for forming the first intermediate image arranged in the beam path proximate the entrance.

16. The microscope tube as claimed in claim 1, wherein a beam splitter is arranged in the beam path preceding the optical system, said beam splitter splitting said beam path into a beam path for the first intermediate image and a beam path for a third intermediate image.

17. The microscope tube as claimed in claim 16, further comprising a connection for a camera, said connection being arranged such that the third intermediate image can be captured by a camera connected to the connection.

18. The microscope tube as claimed in claim 16, wherein the beam splitter deflects the beam path leading to the optical system.

19. The microscope tube as claimed in claim 1, further comprising a second deflecting element and wherein the first deflecting element immediately precedes the collecting optics in the beam path and is pivotable or rotatable together with the collecting optics, and further comprising a linkage which, when pivoting the collecting optics by a predetermined pivoting angle, tilts the second deflecting element by an angle about half the size of the pivoting angle.

* * * * *